(12) United States Patent
Choisnet et al.

(10) Patent No.: US 7,051,586 B2
(45) Date of Patent: May 30, 2006

(54) METHOD FOR DETERMINING AERODYNAMIC PARAMETERS AND METHOD FOR DETECTING FAILURE OF A PROBE USED FOR DETERMINING AERODYNAMIC PARAMETERS

(75) Inventors: Joel Choisnet, Naveil (FR); Lionel Collot, Vendome (FR); Nicolas Hanson, Danze (FR)

(73) Assignee: Thales, (FR)

( * ) Notice: Subject to any disclaimer, the term of this patent is extended or adjusted under 35 U.S.C. 154(b) by 0 days.

(21) Appl. No.: 10/416,892

(22) PCT Filed: Nov. 16, 2001

(86) PCT No.: PCT/FR01/03605

§ 371 (c)(1),
(2), (4) Date: May 16, 2003

(87) PCT Pub. No.: WO02/41008

PCT Pub. Date: May 23, 2002

(65) Prior Publication Data

US 2004/0011124 A1    Jan. 22, 2004

(30) Foreign Application Priority Data

Nov. 17, 2000    (FR) .................................. 00 14885

(51) Int. Cl.
*G01M 9/00*    (2006.01)

(52) U.S. Cl. .................. 73/147; 73/170.02; 73/170.11; 33/549

(58) Field of Classification Search .................. 73/147, 73/170.02, 170.11; 33/549
See application file for complete search history.

(56) References Cited

U.S. PATENT DOCUMENTS

| 4,797,603 A | 1/1989 | Choisnet |
| 4,972,725 A | 11/1990 | Choisnet |

(Continued)

FOREIGN PATENT DOCUMENTS

DE    37 27 906 A    3/1989

*Primary Examiner*—Eric S. McCall
*Assistant Examiner*—Jermaine Jenkins
(74) *Attorney, Agent, or Firm*—Lowe Hauptman & Berner, LLP

(57) ABSTRACT

The invention pertains to a process for determining aerodynamic parameters of an airflow surrounding an aircraft. On the basis of at least two probes situated on the skin of the aircraft, each probe comprising means for measuring the local angle of attack ($\alpha_{loc\ i}$, $\alpha_{loc\ j}$), the process consists in determining the angle of attack ($\alpha$) and/or sideslip ($\beta$) of the aircraft, as a function of the local angle of attack of each probe and of the aerodynamic field of the aircraft. The invention also pertains to a process for detecting a fault with a probe used to determine the aerodynamic parameters of the airflow surrounding an aircraft. This fault detection process consists in:

determining for all the groups of two probes:
the angle of attack and/or sideslip as a function of the local angles of attack and of the aerodynamic field of the aircraft,
various values of the pressure coefficient of each probe as a function of the local angle of attack of each probe and of the aerodynamic field of the aircraft,
the upstream infinity static pressure as a function of the pressure coefficient and of the local static pressure of one and the same probe and as a function of a measurement of the total pressure,
intercomparing the values of upstream infinity static pressure, the angle of attack values and/or the angle of sideslip values.

14 Claims, 3 Drawing Sheets

U.S. PATENT DOCUMENTS

| | | |
|---|---|---|
| 5,010,775 A | 4/1991 | Choisnet |
| 5,406,839 A | 4/1995 | Leblond et al. |
| 5,442,958 A * | 8/1995 | Hagen ............... 73/170.02 |
| 5,616,861 A | 4/1997 | Hagen |
| 5,797,105 A * | 8/1998 | Nakaya et al. ............ 701/7 |
| 5,852,237 A * | 12/1998 | Renshaw ............... 73/180 |
| 6,091,335 A | 7/2000 | Breda et al. |
| 6,176,130 B1 * | 1/2001 | Nakaya et al. ........... 73/182 |
| 6,490,510 B1 | 12/2002 | Choisnet |
| 6,609,421 B1 * | 8/2003 | Cronin et al. ......... 73/170.02 |
| 2002/0184943 A1 | 12/2002 | Collot et al. |
| 2003/0051546 A1 | 3/2003 | Collot et al. |

* cited by examiner

| | Probe i | | Probe j | | Probe k | |
|---|---|---|---|---|---|---|
| i-j | $Ps_{i\alpha ij}$ | $Ps_{i\beta ij}$ | $Ps_{j\alpha ij}$ | $Ps_{j\beta ij}$ | $Ps_{k\alpha ij}$ | $Ps_{k\beta ij}$ |
| i-k | $Ps_{i\alpha ik}$ | $Ps_{i\beta ik}$ | $Ps_{j\alpha ik}$ | $Ps_{j\beta ik}$ | $Ps_{k\alpha ik}$ | $Ps_{k\beta ik}$ |
| j-k | $Ps_{i\alpha jk}$ | $Ps_{i\beta jk}$ | $Ps_{j\alpha jk}$ | $Ps_{j\beta jk}$ | $Ps_{k\alpha jk}$ | $Ps_{k\beta jk}$ |

FIG. 3

METHOD FOR DETERMINING AERODYNAMIC PARAMETERS AND METHOD FOR DETECTING FAILURE OF A PROBE USED FOR DETERMINING AERODYNAMIC PARAMETERS

The invention pertains to a process for determining aerodynamic parameters and to a process for detecting a fault with a probe used to determine the aerodynamic parameters of the airflow surrounding an aircraft.

The piloting of any aircraft requires a knowledge of its relative speed with respect to the air, that is to say to the relative wind. This speed is determined with the aid of sensors of the static pressure Ps, of the total pressure Pt, of the angle of attack $\alpha$ and of the angle of sideslip $\beta$. $\alpha$ and $\beta$ provide the direction of the speed vector in a reference system, or reference frame, tied to the aircraft and (Pt–Ps) provides the modulus of this speed vector. The four aerodynamic parameters therefore make it possible to determine the speed vector of an airplane and, as the case may be, of a so-called convertible tilt-rotor aircraft.

The various sensors for measuring static pressure, total pressure and angle of attack can be grouped together in a so-called multifunction probe. This probe may be stationary such as that described in patent U.S. Pat. No. 5,628,565 or mobile such as that described in French patent 2 665 539. Such a probe gives a direct measurement of the total pressure Pt. On the other hand, it does not allow measurement of the static pressure Ps the angle of attack $\alpha$ and sideslip $\beta$ of the airflow at the site at which it is situated. Specifically, the flow is disturbed by the shape of the aircraft. To determine the upstream infinity static pressure Ps as well as the angle of attack $\alpha$ and sideslip $\beta$ of the aircraft, it is necessary to use several probes, in general two, positioned at precise sites on the skin of the aircraft, for example symmetrically with respect to a vertical plane of symmetry of the aircraft. These two probes form a measurement pathway.

Moreover, to make the measurements secure and to circumvent any fault with a probe, it is necessary to multiply the number of measurement pathways. For example with three measurement pathways, it is possible to note a defect in a probe when one of the pathways gives a different result from the other two. One then deduces therefrom that the pathway whose result differs is defective. Nevertheless, inside this pathway, the probe which is actually faulty remains undetermined.

The aim of the invention is to alleviate these various defects by proposing a process for determining the aerodynamic parameters of an airflow surrounding an aircraft using at least two probes and making it possible to dispense with imperative positions for the placement of the probes.

To achieve this aim, the subject of the invention is a process for determining aerodynamic parameters of an airflow surrounding an aircraft, characterized in that on the basis of at least two probes situated on the skin of the aircraft, each probe comprising means for measuring the local angle of attack, the process consists in determining the angle of attack and sideslip of the aircraft, as a function of the local angle of attack of each probe and of the aerodynamic field of the aircraft.

By using a process for determining the aerodynamic parameters in accordance with the invention, it is possible to reduce the number of probes while retaining the same security of measurement.

To this end, the subject of the invention is also a process for detecting a fault with a probe used to determine aerodynamic parameters, of an airflow surrounding an aircraft, characterized in that on the basis of at least three probes situated on the skin of the aircraft, each probe comprising means for measuring the local angle of attack and means for measuring the local static pressure, the process consists in:

either:
  determining for all the groups of two probes:
    the angle of attack and sideslip as a function of the local angles of attack and of the aerodynamic field of the aircraft,
    various values of the pressure coefficient of each probe as a function of the local angle of attack of each probe and of the aerodynamic field of the aircraft,
    the upstream infinity static pressure as a function of the pressure coefficient and of the local static pressure of one and the same probe and as a function of a measurement of the total pressure
  intercomparing the values of upstream infinity static pressure as well as the angle of attack values;

or:
  determining for all the groups of two probes:
    the angle of sideslip as a function of the local angles of attack and of the aerodynamic field of the aircraft,
    various values of the pressure coefficient of each probe as a function of the local angle of attack of each probe and of the aerodynamic field of the aircraft,
    the upstream infinity static pressure as a function of the pressure coefficient and of the local static pressure of one and the same probe and as a function of a measurement of the total pressure,
  intercomparing the values of upstream infinity static pressure as well as the angle of attack values.

Advantageously, for greater security, it is possible to determine the angle of attack values and also the angle of sideslip values and then to intercompare them.

By virtue of this fault detection process, it is possible, with three probes, to tolerate a defective probe or more generally with N probes, to accept N–2 defective probes while still determining the aerodynamic parameters.

The invention will be better understood and other advantages will become apparent on reading the detailed description of an embodiment of the invention, description illustrated by the appended drawing in which:

FIG. 3 represents in a table, various values of the upstream infinity static pressure determined using three probes.

For any aircraft, it is possible to determine its aerodynamic field, that is to say that at any point of the skin of the aircraft one determines the local angle of attack $\alpha_{loc}$ of the air stream as a function of the angle of attack $\alpha$ and of the angle of sideslip $\beta$ of the aircraft. It is recalled that the angle of attack $\alpha$ is the angle made by the air stream surrounding the aircraft with respect to a horizontal plane of the aircraft and that the angle of sideslip $\beta$ is the angle made by this same air stream with respect to a vertical plane of the aircraft. The vertical plane is, in general, a plane of symmetry of the aircraft. The aerodynamic field can, for example, be determined by means of the calculation method formulated by J. HESS and A. SMITH. This method was published in 1967 under the name "Calculation of potential flow about arbitrary bodies" in volume 8 of the collection "Progress in aeronautical sciences" published by "Pergamon Press".

A measurement of the local angle of attack is made at two distinct points i and j situated on the skin of the aircraft, by means of two probes, each one situated at one of the two points i and j. The measurements carried out at the points i and j will be denoted $\alpha_{loc\ i}$ and $\alpha_{loc\ j}$ respectively. For convenience, the reference i will be given for the probe situated at the point i, and j for the probe situated at the point j for the subsequent description. Each measurement $\alpha_{loc\ i}$ and $\alpha_{loc\ j}$ varies as a function of the angle of attack α and sideslip β. These functions may be written:

$$\alpha_{loc\ i} = f_i(\alpha, \beta)$$

$$\alpha_{loc\ j} = f_j(\alpha, \beta)$$

The functions $f_i$ and $f_j$ are given by the aerodynamic field of the aircraft. These two equations form a system with two unknowns which it is possible to solve in order to determine the values of the angle of attack α and sideslip β.

This process makes it possible to position the two probes i and j substantially anywhere on the skin of the aircraft. Nevertheless, care will be taken to avoid a few pairs of particular points which would not allow the system of equations to be solved. A pair of points i and j, where the two functions $f_i$ and $f_j$ would be substantially equal, is for example to be avoided. By way of illustration, this process makes it possible to use two probes situated on the same side of the aircraft.

Figure 1:
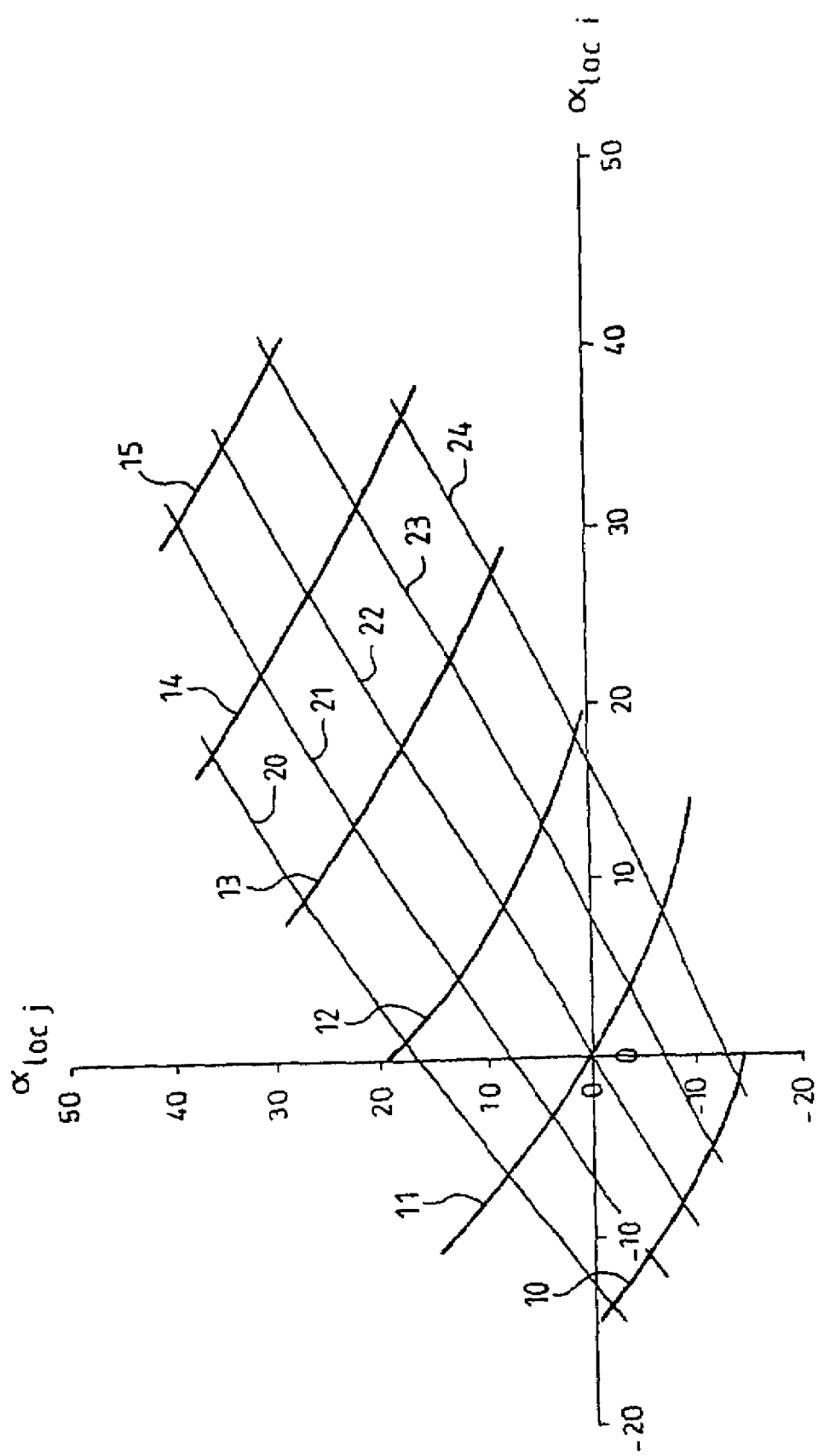
FIG. 1 represents a net of curves of constant angle of attack and another net of curve of constant angle of sideslip as a function of the local angle of attack measured by two separate probes.

FIG. 1 illustrates by way of example a method of graphical solution of the equation system with two unknowns. FIG. 1 represents an orthogonal frame of reference where the value of the local angle of attack $\alpha_{loc\ i}$ is plotted along the abscissa axis and where the value of the local angle of attack $\alpha_{loc\ j}$ is plotted along the ordinate axis. In this frame of reference a first net of substantially parallel curves represents points at which the angle of attack α is constant. On curve 10, the angle of attack α has a constant value of −5°. On curve 11, the angle of attack α has a constant value of 0°. On curve 12, the angle of attack α has a constant value of +5°. On curve 13, the angle of attack α has a constant value of +10°. On curve 14, the angle of attack α has a constant value of +15°. On curve 15, the angle of attack α has a constant value of +20°. A second net of likewise substantially parallel curves represents points at which the sideslip angle β is constant. On curve 20, the sideslip angle β has a constant value of −10°. On curve 21, the sideslip angle β has a constant value of −5°. On curve 22, the sideslip angle β has a constant value of 0°. On curve 23, the sideslip angle β has a constant value of +5°. On curve 24, the sideslip angle β has a constant value +10°.

The two nets of curves being secant, it is possible, on the basis of the value of the local angle of attack $\alpha_{loc\ i}$ plotted along the abscissa and on the basis of the value of the local angle of attack $\alpha_{loc\ j}$ plotted along the ordinate, to determine the value of the angle of attack α and that of the angle of sideslip β of the aircraft. It will be possible to determine the values α and β by interpolation between two neighboring curves.

Curves 10 to 15 and 20 to 24 of the two nets give values of α and β separated by 5°. This 5° gap is of course given merely by way of example and it is possible to increase the accuracy of determination of α and β by adding as many intermediate curves as necessary.

It is moreover possible to use computer means to solve the system of equations for example by storing the various curves as a function of the possible measurements of the local angle of attack $\alpha_{loc\ i}$ and $\alpha_{loc\ j}$.

Advantageously, each probe i and j furthermore comprises means for measuring the local static pressure $Ps_{loci}$, $Ps_{locj}$. This makes it possible to determine the upstream infinity static pressure Ps of the airflow surrounding the aircraft as a function of the local angle of attack $\alpha_{loc\ i}$ and $\alpha_{loc\ j}$, of the local static pressure $Ps_{loc\ i}$ and $Ps_{loc\ j}$ and of the aerodynamic field of the aircraft. To determine the upstream infinity static pressure Ps, it is possible to determine a pressure coefficient $Kp_i$ or $Kp_j$ of one of the two probes as a function of the local angle of attack $\alpha_{loc\ i}$ and $\alpha_{loc\ j}$ and of the aerodynamic field of the aircraft. The upstream infinity static pressure Ps is deduced from the pressure coefficient $Kp_i$ or $Kp_j$, from the local static pressure $Ps_{loc\ i}$ or $Ps_{loc\ j}$, according to the coefficient Kp chosen, and from a measurement of the total pressure Pt of the flow. For a given probe, for example probe i, the pressure coefficient $Kp_i$ is expressed as follows:

$$Kp_i = (Ps_{loc\ i} - Ps)/(Pt - Ps)$$

Advantageously, one of the probes or both, comprises means for measuring the total pressure Pt. These means comprise for example an open tube substantially facing the flow and at the back of which the pressure is measured. These means are known by the name Pitot tube.

Experience has shown that the measurement of the total pressure Pt is rather insensitive to the placement of the probe on the skin of the aircraft carrying the means for measuring the total pressure Pt.

More precisely, for a given probe, for example that situated at the point i, the pressure coefficient $Kp_i$ is determined as a function of the local angle of attack $\alpha_{loc\ i}$ and of one of the angles of orientation α or β of the aircraft with respect to the surrounding air stream.

$$Kp_i = f_\alpha(\alpha_{loc\ i}, \alpha)$$

or $$Kp_i = f_\beta(\alpha_{loc\ i}, \beta)$$

The functions $f_\alpha$ and $f_\beta$ are given by the aerodynamic field of the aircraft and it is therefore easy to determine the pressure coefficient $Kp_i$.

Figure 2:
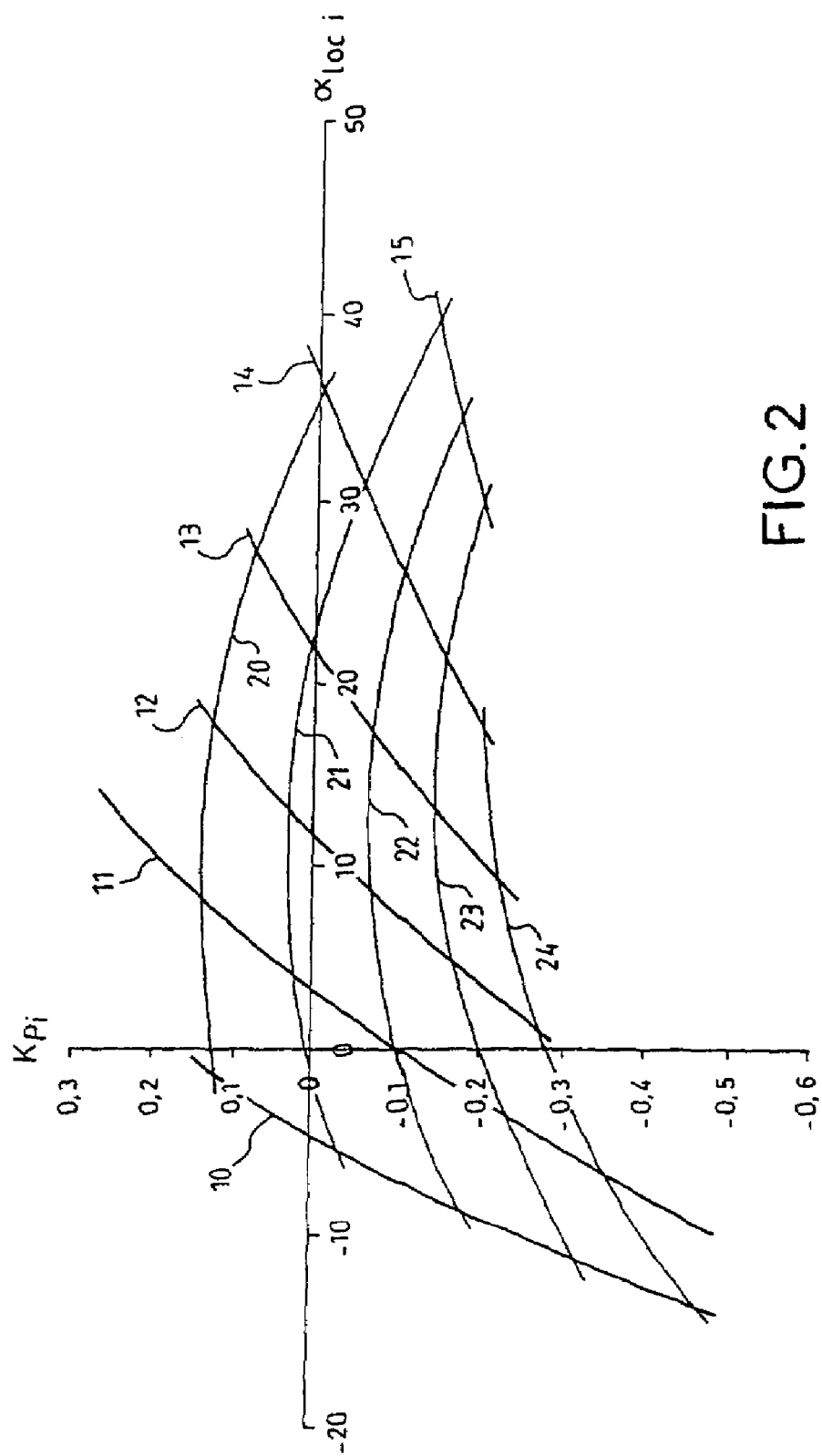
FIG. 2 represents another net of curves of constant angle of attack and of constant angle of sideslip as a function of the local angle of attack measured by a probe and of the pressure coefficient of this same probe.

As previously, it is possible to determine the pressure coefficient graphically. FIG. 2 represents an orthogonal frame of reference where the value of the local angle of attack $\alpha_{loc\ i}$ is plotted along the abscissa axis and where the value of the pressure coefficient $Kp_i$ is plotted along the ordinate axis. In this frame of reference, as in the case of FIG. 1, two nets of curves represent, in the case of one, curves of equal angle of attack α, and in the case of the other, curves of equal angle of sideslip β. For greater convenience, the curves represented in FIG. 2 bear the same references as those represented in FIG. 1 for the same values of angle of attack α or of sideslip β.

Once the coefficient $Kp_i$ has been determined, it is sufficient to use the formula:

$$Kp_i = (Ps_{loc\ i} - Ps)/(Pt - Ps)$$

to determine the upstream infinity static pressure Ps.

The abovedescribed process for determining the aerodynamic parameters matches up the values of local angle of attack and of local static pressure measured by two separate probes. By using at least three probes and by pairwise matching of the values measured by the probes, it is possible to accurately locate any fault either with regard to a measurement of local angle of attack, or with regard to a measurement of pressure, local static or total.

Generally, the process consists in:
determining for all the groups of two probes:
the angle of attack as a function of the local angles of attack and of the aerodynamic field of the aircraft,
various values of the pressure coefficient of each probe as a function of the local angle of attack of each probe and of the aerodynamic field of the aircraft,
the upstream infinity static pressure as a function of the pressure coefficient and of the local static pressure of one and the same probe and as a function of a measurement of the total pressure,
intercomparing the values of upstream infinity static pressure, the angle of attack values and/or the angle of sideslip values.

The fault detection process will be better understood on the basis of an example comprising three probes i, j and k, situated at three separate points. Each of these probes measures the local angle of attack, respectively $\alpha_{loc\ i}$, $\alpha_{loc\ j}$ and $\alpha_{loc\ k}$, the local static pressure $Ps_{loc\ i}$, $Ps_{loc\ j}$ and $Ps_{loc\ k}$ and also the total pressure $Pt_i$, $Pt_j$ and $Pt_k$.

The matching up of probes i and j makes it possible to determine an angle of attack $\alpha_{ij}$ and an angle of sideslip $\beta_{ij}$. The matching up of probes j and k makes it possible to determine an angle of attack $\alpha_{jk}$ and an angle of sideslip $\beta_{jk}$. Likewise, the matching up of probes i and k makes it possible to determine an angle of attack $\alpha_{ik}$ and an angle of sideslip $\beta_{ik}$.

Each calculated value of angle of attack $\alpha_{ij}$, $\alpha_{ik}$ and $\alpha_{jk}$ makes it possible to determine three values of pressure coefficients Kp for each of the three probes, i.e. nine pressure coefficient values for the set of three probes. These nine values of Kp make it possible to calculate nine other values of upstream infinity static pressure. Nine other values of pressure coefficient and nine other values of upstream infinity static pressure are determined in the same manner on the basis of the angle of sideslip values $\beta_{ij}$, $\beta_{ik}$ and $\beta_{jk}$. The pressure coefficient of probe i, determined from the angle of attack value $\alpha_{ij}$, will be denoted $Kp_{i\alpha ij}$. The other values of pressure coefficients and of upstream infinity static pressure will be denoted in a similar manner by modifying the subscripts.

The FIG. 3 table represents the 18 values determined for the upstream infinity static pressure. In this table, three double columns represent each probe for which a value of the pressure coefficient has been determined.

The left part of each double column comprises values of upstream infinity static pressure determined from an angle of attack value $\alpha$. The right part of each double column comprises values of upstream infinity static pressure determined from an angle of sideslip value $\beta$. The table comprises three rows each having values of upstream infinity static pressure determined from the matching up of two probes: matching up of i-j, i-k and j-k.

On completion of the determination of the various values of the upstream infinity static pressure, these values are intercompared. The angle of attack values and/or the angle of sideslip values are likewise intercompared, as are the values of total pressure. These comparisons make it possible to accurately locate any fault with a probe.

For a better understanding of how these comparisons will enlighten us as to a possible fault, let us take the example of a fault in the measurement of the local angle of attack of probe i, the measurements of local static pressure and of total pressure being correct. The matching up of probe i with the other two probes j and k gives false values of attack angle and of sideslip angle. Hence, we have $\alpha_{ij}$ and $\alpha_{ik}$, respectively, $\beta_{ij}$ and $\beta_{ik}$, false but we have $\alpha_{jk}$, respectively, $\beta_{jk}$, correct. Experience has shown that in this case: $\alpha_{ij}$, $\alpha_{ik}$ and $\alpha_{jk}$, and respectively $\beta_{ij}$, $\beta_{ik}$, and $\beta_{jk}$, are distinct. Further on in the determinations, among the values of upstream infinity static pressure, only the values of $Ps_{j\alpha jk}$, $Ps_{j\beta jk}$, $Ps_{k\alpha jk}$ and $Ps_{k\beta jk}$ are correct and hence substantially equal. The other 14 values of upstream infinity static pressure are false and experience has shown that the false values are different. The comparison consequently makes it possible to determine the place of the fault. Specifically, only the matching up of probes j and k and the determination of the pressure coefficient of these two probes give substantially equal values of upstream infinity static pressure, thereby making it possible to identify a fault with probe i.

Let us now consider a fault in one of the means for measuring the total pressure Pt. This fault can be discerned by simple comparison of the values $Pt_i$, $Pt_j$ and $Pt_k$ of total pressure measured by each probe i, j and k. The probe which is faulty with regard to its measurement of total pressure Pt is that which gives a different measurement from the other probes.

Finally, let us consider the case of a fault in the measurement of the local static pressure, for example of probe i. The measurements of local angles of attack being assumed correct, the determination of the angle of attack $\alpha$ and of sideslip $\beta$ gives three substantially equal pairs of values $\alpha_{ij}$, $\beta_{ij}$; $\alpha_{ik}$, $\beta_{ik}$; $\alpha_{jk}$, $\beta_{jk}$. The faulty probe can therefore be located by comparing the 18 values obtained, see FIG. 3, of the upstream infinity static pressure. Six of the 18 values calculated from the false local static pressure will be distinct from the other 12 which are substantially equal. The faulty probe is the one which has measured the local static pressure leading to the false values of upstream infinity static pressure.

To summarize, the intercomparison of the values of angle of attack $\alpha$ or of the values of angle of sideslip $\beta$ makes it possible to ascertain the existence of a fault with regard to a measurement of local angle of attack. Specifically, correct measurements of local angle of attack would give rise to substantially identical values for $\alpha_{ij}$, $\alpha_{ik}$ and $\alpha_{jk}$ and likewise for $\beta_{ij}$, $\beta_{ik}$ and $\beta_{jk}$. The intercomparison of the values of upstream infinity static pressure makes it possible to locate the defective means of measuring local angle of attack. More precisely, a fault is identified on one of the means for measuring local angle of attack $\alpha_{loc\ i}$, $\alpha_{loc\ j}$, $\alpha_{loc\ k}$ when the angle of attack values $\alpha_{ij}$, $\alpha_{ik}$, $\alpha_{jk}$ or the angle of sideslip values $\beta_{ij}$, $\beta_{ik}$, $\beta_{jk}$ are not substantially equal. The intercomparison of the values of upstream infinity static pressure (from $Ps_{i\alpha ij}$ to $Ps_{k\beta jk}$) makes it possible to locate the defective probe.

The intercomparison of the measurements of total pressure makes it possible to determine the existence of a fault in a measurement of total pressure and to locate it. More precisely, a fault is identified on a probe's means for measuring the total pressure $Pt_i$, $Pt_j$, $Pt_k$ of a probe when the measured values of total pressure are not substantially equal. The defective means for measuring the total pressure are located through a value of total pressure $Pt_i$, $Pt_j$, $Pt_k$ substantially different from the others.

If the values of the angle of attack, of the angle of sideslip and of the total pressure are substantially equal, the comparison of the values of static pressure makes it possible to determine and to locate any fault among the means for measuring local static pressure. In this instance, if the local static pressure tap of probe i is faulty, the six double-column values, corresponding to probe i, represented in FIG. 3, will be different and the other twelve values, corresponding to probes j and k, will be substantially equal. More precisely, a fault is identified on the means for measuring the local static pressure $Ps_{loc\ i}$, $Ps_{loc\ j}$, $Ps_{loc\ k}$ when the angle of attack values $\alpha_{ij}$, $\alpha_{ik}$, $\alpha_{jk}$ are substantially equal, the angle of sideslip values $\beta_{ij}$, $\beta_{ik}$, $\beta_{jk}$ are substantially equal, the values of the total pressure PT are substantially equal, and when the values of the upstream infinity static pressure (from $Ps_{i\alpha ij}$ to $Ps_{k\beta jk}$) are not substantially equal. The defective means for measuring the local static pressure $Ps_{loc\ i}$, $Ps_{loc\ j}$, $Ps_{loc\ k}$ are located by comparison of the values of upstream infinity static pressure (from $Ps_{i\alpha ij}$ to $Ps_{k\beta jk}$).

Finally, a fault is located on the means for measuring local static pressure $Ps_{loc\ i}$ $Ps_{loc\ j}$, $Ps_{loc\ k}$ or on means for measuring the total pressure $P_T$ of a probe when the upstream infinity static pressure values emanating from this probe are not substantially equal although the angle of attack and sideslip values are substantially equal. The comparison between the measurements of total pressure makes it possible to locate the fault on one of the means for measuring the total pressure if these measurements are different. In the converse case, the fault is located on one of the means for measuring the local static pressure.

It is noted that it is not necessary to determine the angle of attack values a and also the angle of sideslip values β. Using three probes, i, j and k, the determination of one of these two parameters α or β is sufficient to ascertain the existence of a fault in a measurement of local angle of attack. Moreover, using just one of these two parameters, it is possible to determine nine values of upstream infinity static pressure and it is sufficient that two of them, emanating from one and the same matching up of two probes, be substantially equal in order to locate a defective probe and to ascertain the value of upstream infinity static pressure to be adopted. Nevertheless, by determining the three values of angle of attack $\alpha_{ij}$, $\alpha_{ik}$ and $\alpha_{jk}$ and also the three values of angle of sideslip $\beta_{ij}$, $\beta_{ik}$ and $\beta_{jk}$ it is possible to improve security in fault detection.

Furthermore, using three probes, it is possible to reveal a defect in one of the three probes. Likewise, with four probes, again by pairwise matching of two probes, it is possible to locate distinct faulty probes while still performing correct measurements of the various aerodynamic parameters with the aid of the two remaining probes. In a general manner, the fault detection process can be implemented regardless of the number N of probes, at least equal to three, and makes it possible to locate N−2 defective probes while still performing correct measurements of the angle of attack α, sideslip β, total pressure Pt and upstream infinity static pressure Ps.

The invention claimed is:

1. A process, comprising:
   determining aerodynamic parameters of an airflow surrounding an aircraft, on the basis of at least two probes situated on the skin of the aircraft, each said probe comprising means for measuring the local angle of attack ($\alpha_{loc\ i}$, $\alpha_{loc\ j}$), wherein said process comprises determining any one of the angle of attack (α) and sideslip (β) of the aircraft, as a function of the local angle of attack of each said probe and of the aerodynamic field of the aircraft.

2. The process as claimed in claim 1, wherein each said probe further comprises means for measuring the local static pressure ($Ps_{loci}$, $Ps_{locj}$) and the process further comprises the steps of determining the upstream infinity static pressure (Ps) of the airflow surrounding the aircraft as a function of the local angle of attack ($\alpha_{loc\ i}$, $\alpha_{loc\ j}$), of the total pressure (Pt), of the local static pressure ($Ps_{loc\ i}$, $Ps_{loc j}$) and of the aerodynamic field of the aircraft.

3. The process as claimed in claim 2, further comprising the steps of:
   determining the angle of attack (α) and sideslip (β) as a function of the measured local angles of attack ($\alpha_{loc\ i}$, $\alpha_{loc\ j}$), and of the aerodynamic field of the aircraft;
   determining the pressure coefficient ($Kp_i$, $Kp_j$) of each said probe as a function of the local angle of attack ($\alpha_{loc\ i}$, $\alpha_{loc\ j}$) of each said probe and of the aerodynamic field of the aircraft; and
   determining the upstream infinity static pressure (Ps) as a function of the pressure coefficient ($Kp_i$, $Kp_j$) and of the local static pressure ($Ps_{loc\ i}$, $Ps_{loc\ j}$) of a said probe and as a function of the total pressure (Pt),
   a said pressure coefficient $Kp_i$ of a probe being expressed as follows:

$$Kp_i = (Ps_{loc\ i} - Ps)/(Pt - Ps),$$

wherein $Ps_{loc\ i}$ represents the local static pressure of the relevant probe, wherein Ps represents the upstream infinity static pressure, and wherein Pt represents the total pressure.

4. The process as claimed in claim 3, wherein a net of curves of constant angle of attack (α) and a net of curves of constant angle of sideslip (β) are determined as a function of the local angles of attack ($\alpha_{loc\ i}$, $\alpha_{loc\ j}$) on the basis of the aerodynamic field.

5. The process as claimed in claim 3, wherein a net of curves of constant angle of attack (α) and a net of curves of constant angle of sideslip (β) are determined as a function of the local angle of attack ($\alpha_{loc\ i}$, $\alpha_{loc\ j}$) of a said probe (i, j) and of the pressure coefficient ($Kp_i$, $Kp_j$) of said probe on the basis of the aerodynamic field.

6. A process for detecting a fault with a probe used to determine aerodynamic parameters of an airflow surrounding an aircraft on the basis of at least three probes situated on the skin of the aircraft, each said probe comprising means for measuring the local angle of attack ($\alpha_{loc\ i}$, $\alpha_{loc\ j}$, $\alpha_{loc\ k}$) and means for measuring the local static pressure $Ps_{loc\ i}$, $Ps_{loc\ j}$ and $Ps_{loc\ k}$), the process comprising the steps of:
   determining for any group of two probes:
     (i) the angle of attack ($\alpha_{ij}$, $\alpha_{ik}$, $\alpha_{jk}$) as a function of the local angles of attack ($\alpha_{loc\ i}$, $\alpha_{loc\ j}$, $\alpha_{loc\ k}$) and of the aerodynamic field of the aircraft;
     (ii) one or more values of the pressure coefficient (from $Kp_{i\alpha ij}$ to $Kp_{k\alpha jk}$) of each said probe (i, j, k) as a function of the local angle of attack ($\alpha_{loc\ i}$, $\alpha_{loc\ j}$, $\alpha_{loc\ k}$) of each said probe and of the aerodynamic field of the aircraft;
     (iii) the upstream infinity static pressure (from $Ps_{i\alpha ij}$ to $Ps_{k\alpha jk}$) as a function of the pressure coefficient (from $Kp_{i\alpha ij}$ to $Kp_{k\alpha jk}$) and of the local static pressure ($Ps_{loc\ i}$, $Ps_{loc\ j}$, $Ps_{loc\ k}$) of a said probe (i, j, k) and as a function of a measurement of the total pressure (Pt);
   intercomparing the values of upstream infinity static pressure as well as the values of the angle of attack ($\alpha_{ij}$, $\alpha_{ik}$, $\alpha_{jk}$);
   identifying a possible fault with a said probe by evaluating differences between the values of upstream infinity static pressure;
   identifying a possible fault with a said probe by evaluating differences between the values of upstream infinity static pressure (from $Ps_{i\alpha ij}$ to $Ps_{k\alpha jk}$) as well as between the values of angle of attack ($\alpha_{ij}$, $\alpha_{jik}$, $\alpha_{jk}$), a said pressure coefficient $Kp_i$ of a probe being expressed as follows:

$$Kp_i=(Ps_{loc\ i}-Ps)/(Pt-Ps),$$

wherein $Ps_{loc\ i}$ represents the local static pressure of the relevant probe, wherein Ps represents the upstream infinity static pressure, and wherein Pt represents the total pressure.

7. A process for detecting a fault with a probe used to determine aerodynamic parameters of an airflow surrounding an aircraft on the basis of at least three probes situated on the skin of the aircraft, each said probe comprising means for measuring the local angle of attack ($\alpha_{loc\ i}$, $\alpha_{loc\ j}$, $\alpha_{loc\ j}$) and means for measuring the local static pressure ($Ps_{loc\ i}$, $Ps_{loc\ j}$, $Ps_{loc\ k}$), the process comprising the steps of:

determining for all the groups of two probes:
the angle of sideslip ($\beta_{ij}$, $\beta_{ik}$, $\beta_{jk}$) as a function of the local angles of attack ($\alpha_{loc\ i}$, $\alpha_{loc\ j}$, $\alpha_{loc\ k}$) and of the aerodynamic field of the aircraft;
one or more values of the pressure coefficient (from $Kp_{i\beta ij}$ to $Kp_{k\beta jk}$) of each said probe (i, j, k) as a function of the local angle of attack ($\alpha_{loc\ i}$, $\alpha_{loc\ j}$, $\alpha_{loc\ k}$) of each said probe and of the aerodynamic field of the aircraft;
(iii) the upstream infinity static pressure (from $Ps_{i\beta ij}$ to $Ps_{k\beta jk}$) as a function of the pressure coefficient (from $Kp_{i\beta ij}$ to $Kp_{k\beta jk}$) and of the local static pressure ($Ps_{loc\ i}$, $Ps_{loc\ j}$, $Ps_{loc\ k}$) of a said probe (i, j, k) and as a function of a measurement of the total pressure (Pt);
intercomparing the values of upstream infinity static pressure as well as the values of the angle of sideslip ($\beta_{ij}$, $\beta_{ik}$, $\beta_{jk}$);
identifying a possible fault with a said probe by evaluating differences between the values of upstream infinity static pressure (from $Ps_{i\alpha ij}$ to $Ps_{k\alpha jk}$) as well as between the values of angle of sideslip ($\beta_{ij}$, $\beta_{ik}$, $\beta_{jk}$), a said pressure coefficient $Kp_i$ of a probe being expressed as follows:

$$Kp_i=(Ps_{loc\ i}-Ps)/(Pt-Ps),$$

wherein $Ps_{loc\ i}$ represents the local static pressure of the relevant probe, wherein Ps represents the upstream infinity static pressure, and wherein Pt represents the total pressure.

8. The process as claimed in claim 6, comprising the steps of detecting by a fault means for measuring local angle of attack ($\alpha_{loc\ i}$, $\alpha_{loc\ j}$, $\alpha_{loc\ k}$) when the angle of attack values ($\alpha_{ij}$, $\alpha_{ik}$, $\alpha_{jk}$) or the angle of sideslip values ($\beta_{ij}$, $\beta_{ik}$, $\beta_{jk}$) are not substantially equal.

9. The process as claimed in claim 7, wherein at least one of said probes comprises means for measuring a total pressure therefrom ($Pt_i$, $Pt_j$, $Pt_k$).

10. The process as claimed in claim 6, wherein a said fault is identified by the means for measuring the local angle of attack ($\alpha_{loc\ i}$, $\alpha_{loc\ j}$, $\alpha_{loc\ k}$) when the angle of attack values ($\alpha_{ij}$, $\alpha_{ik}$, $\alpha_{jk}$) or the angle of sideslip values ($\beta_{ij}$, $\beta_{ik}$, $\beta_{jk}$) are not substantially equal, and wherein the intercomparison of the values of upstream infinity static pressure (from $Ps_{i\alpha ij}$ to $Ps_{k\alpha jk}$; from $Ps_{i\beta ij}$) makes it possible to locate a defective probe.

11. The process as claimed in claim 9, wherein a said fault is identified by a means for measuring the total pressure of a probe ($Pt_i$, $Pt_j$, $Pt_k$) when the measured values of total pressure are not substantially equal, and the defective means for measuring the total pressure ($P_T$) are located through a value of total pressure ($Pt_i$, $Pt_j$, $Pt_k$) substantially different from the others.

12. The process as claimed in claim 6, wherein a said fault is identified by a means for measuring the local static pressure ($Ps_{loc\ i}$, $Ps_{loc\ j}$, $Ps_{loc\ k}$) when the angle of attack values ($\alpha_{ij}$, $\alpha_{ik}$, $\alpha_{jk}$) are substantially equal, the angle of sideslip values ($\beta_{ij}$, $\beta_{ik}$, $\beta_{jk}$) are substantially equal, the values of the total pressure ($Pt_i$, $Pt_j$, $Pt_k$) are substantially equal, and when the values of the upstream infinity static pressure (from $Ps_{i\alpha ij}$ to $Ps_{k\alpha jk}$; from $Ps_{i\beta ij}$ to $Ps_{k\beta jk}$) are not substantially equal, and the defective means for measuring the local static pressure ($Ps_{loc\ i}$, $Ps_{loc\ j}$, $Ps_{loc\ k}$) are located by comparison of the values of upstream infinity static pressure (from $Ps_{i\alpha ij}$ to $Ps_{k\alpha jk}$; from $Ps_{i\beta ij}$ to $Ps_{k\beta jk}$).

13. The process as claimed in claim 7, wherein a said fault is identified by a means for measuring the total pressure of a probe ($Pt_i$, $Pt_j$, $Pt_k$) when the measured values of total pressure are not substantially equal, and the defective means for measuring the total pressure ($P_T$) are located through a value of total pressure ($Pt_i$, $Pt_j$, $Pt_k$) substantially different from the others, wherein at least one probe comprises means for measuring the total pressure ($Pt_i$, $Pt_j$, $Pt_k$).

14. The process as claimed in claim 7, wherein a said fault is identified by the means for measuring the local static pressure ($Ps_{loc\ i}$, $Ps_{loc\ j}$, $Ps_{loc\ k}$) when the angle of attack values ($\alpha_{ij}$, $\alpha_{ik}$, $\alpha_{jk}$) are substantially equal, the angle of sideslip values ($\beta_{ij}$, $\beta_{ik}$, $\beta_{jk}$) are substantially equal, the values of the total pressure ($Pt_i$, $Pt_j$, $Pt_k$) are substantially equal, the values of the upstream infinity static pressure (from $Ps_{i\alpha ij}$ to $Ps_{k\alpha jk}$; from $Ps_{i\beta ij}$ to $Ps_{k\beta jk}$) are not substantially equal, and the defective means for measuring the local static pressure ($Ps_{loc\ i}$, $Ps_{loc\ j}$, $Ps_{loc\ k}$) are located by comparison of the values of upstream infinity static pressure (from $Ps_{i\alpha ij}$ to $Ps_{k\alpha jk}$; from $Ps_{i\beta ij}$ to $Ps_{k\beta jk}$), wherein at least one probe comprises means for measuring the total pressure ($Pt_i$, $Pt_j$, $Pt_k$).

* * * * *